(12) United States Patent
Ren et al.

(10) Patent No.: US 11,782,024 B2
(45) Date of Patent: Oct. 10, 2023

(54) CAPILLARY ARRAY ELECTROPHORESIS-CHEMILUMINESCENCE DETECTION COUPLED SYSTEM

(71) Applicant: Shanghai Jiao Tong University, Shanghai (CN)

(72) Inventors: Jicun Ren, Shanghai (CN); Xiangyi Huang, Shanghai (CN); Meilisha Xu, Shanghai (CN)

(73) Assignee: Shanghai Jiao Tong University, Shanghai (CN)

( * ) Notice: Subject to any disclaimer, the term of this patent is extended or adjusted under 35 U.S.C. 154(b) by 0 days.

(21) Appl. No.: 18/146,834

(22) Filed: Dec. 27, 2022

(65) Prior Publication Data

US 2023/0138856 A1 May 4, 2023

(30) Foreign Application Priority Data

Dec. 30, 2021 (CN) .......................... 202111637304.5

(51) Int. Cl.
*G01N 27/453* (2006.01)
*G01N 21/76* (2006.01)
*G01N 27/447* (2006.01)

(52) U.S. Cl.
CPC ....... *G01N 27/44756* (2013.01); *G01N 21/76* (2013.01); *G01N 27/44726* (2013.01)

(58) Field of Classification Search
CPC ....... G01N 27/44756; G01N 27/44721; G01N 27/44726; G01N 21/76; G01N 30/74; G01N 2030/743; G01N 2030/746
See application file for complete search history.

(56) References Cited

U.S. PATENT DOCUMENTS

| 5,516,409 A | * | 5/1996 | Kambara | ......... G01N 27/44782 204/603 |
| 2012/0152742 A1 | | 6/2012 | Gorfinkel | |

FOREIGN PATENT DOCUMENTS

| CN | 101692048 A | 4/2010 | |
| CN | 201740760 U | 2/2011 | |
| CN | 111337562 A | 6/2020 | |
| JP | 2005062115 A | * 3/2005 | ............. G01N 27/76 |

OTHER PUBLICATIONS

EPO-machine-generated English language translation Tsukagosh et al. JP2005062115 A, patent published Mar. 10, 2005, tranlsatio downloaded May 21, 2023 (Year: 2005).*
Yuxuan Liu et al.,"Recent advances in chemiluminescence detection coupled with capillary electrophoresis and microchip capillary electrophoresis", ELECTROPHORESIS, 37(1), 2-18.
Fang Yi et al.,"Recent advances in capillary electrophoresis coupled with chemiluminescence detection", Chinese Journal of Chromatography, vol. 35, No. 1, pp. 110-120.

* cited by examiner

*Primary Examiner* — Alexander S Noguerola

(57) ABSTRACT

A capillary array electrophoresis (CAE)-chemiluminescence (CL) detection coupled system includes a high-voltage power supply, a capillary array, an array channel CL reaction tank, a CAE sample tank, a CAE detection tank, a chemiluminescent reagent delivery unit, a multi-channel detection unit, and a data acquisition and processing unit. An inlet end of the capillary array is connected to the CAE sample tank. An outlet end of the capillary array is connected to the array channel CL reaction tank, and is further connected to the CAE detection tank.

10 Claims, 4 Drawing Sheets

CAPILLARY ARRAY ELECTROPHORESIS-CHEMILUMINESCENCE DETECTION COUPLED SYSTEM

CROSS-REFERENCE TO RELATED APPLICATIONS

This application claims the benefit of priority from Chinese Patent Application No. 202111637304.5, filed on Dec. 30, 2021. The content of the aforementioned application, including any intervening amendments thereto, is incorporated herein by reference in its entirety.

TECHNICAL FIELD

This application relates to capillary array electrophoresis (CAE) analysis, and more particularity to a CAE-chemiluminescence detection coupled system for bioanalysis, clinical diagnosis, environmental monitoring, and food safety analysis.

BACKGROUND

Capillary electrophoresis (CE) is an efficient separation and analysis method based on the difference in charge-mass ratio of individual components using capillary as the electrolyte support and a high-voltage electric field as the driving force. The CE has advantages of high separation efficiency, rapid analysis and less sample and reagent consumption, and thus has been widely used in bioanalysis, clinical diagnosis, environmental monitoring, and food safety analysis. Compared to the traditional single-capillary electrophoresis, capillary array electrophoresis (CAE) enables the high-throughput analysis by means of a capillary array, and thus has been widely used in genetic analysis and clinical diagnosis.

At present, the CAE instruments mainly adopt a laser fluorescence detector and an ultraviolet-visible (UV-vis) detector. The laser fluorescence detector is a selective detector with high sensitivity, and has been widely used for genetic sequencing and analysis. The laser fluorescence detector can operate under an imaging mode and a scanning mode. Regarding the imaging mode, a parallel beam of light is emitted to capillaries arrayed in parallel, and the fluorescence emitted by the capillary array is collected by a plane or linear array detector (e.g., charge coupled device (CCD) and diode array detector (DAD)). Whereas, there is fluorescence signal interference between adjacent capillaries. Regarding the scanning mode, a focused laser beam is employed to scan the capillaries one by one, and the fluorescence signal from individual capillaries is collected by a single photon detector such as photomultiplier tube, eliminating the fluorescence and scattering light signal interference between adjacent capillaries. Unfortunately, under the scanning mode, the laser beam or capillary array is often moved mechanically, which leads to poor data collection efficiency. The UV-vis detector has strong versatility, and generally adopts an imaging mode and a fiber optic detection mode. Similar to the laser fluorescence detector, there is also scattering light signal interference in the UV-vis detector under the imaging mode. Regarding the fiber optic detection mode, an excitation fiber (incident light) and a collection fiber are employed to collect an optical absorption signal of each capillary, effectively avoiding the scattering light signal interference between adjacent capillaries. Nevertheless, this mode struggles with low throughput, and the sensitivity of the UV detector is relatively poor, so that the UV-vis detector fails to realize the analysis of low-concentration components. Moreover, the existing CAE detectors (laser fluorescence and UV-vis detectors) all adopt a light source as an excitation source for the sample signal, the background signal generated by which will significantly reduce the sensitivity of the detection system.

SUMMARY

An object of this disclosure is to provide a CAE-chemiluminescence (CL) detection coupled system, which is free of an excitation source, and has simplified CAE structure and reduced costs. The CAE-CL detection coupled system provided herein has excellent sensitivity and high detection throughput, and can be used in bioanalysis, clinical diagnosis, environmental monitoring and food safety analysis.

Technical solutions of this application are described as follows.

This application provides a CAE-CL detection coupled system, comprising:
a power supply with a voltage of 5-30 kV;
a capillary array;
an array channel CL reaction tank;
an electrophoresis anode tank (CAE electrophoresis buffer tank);
an electrophoresis cathode tank (CAE electrophoresis buffer tank);
an imaging lens;
a plane array or linear array detector;
a data acquisition and processing unit; and
a computer;
wherein the electrophoresis anode tank is connected to an anode of the power supply; an outlet end of the capillary array is connected to the array channel CL reaction tank; and the array channel CL reaction tank is connected to the electrophoresis cathode tank, such that the capillary array is further connected to the CAE detection tank. A sample flows out from the outlet end of the capillary array, and then reacts with a chemical reagent to generate CL. The CL is collected by the imaging lens, and the plane array or linear array detector converts an optical signal into an electrical signal. The electrical signal is subjected to the data acquisition and processing unit to obtain a capillary array electropheretogram.

In some embodiments, the array channel CL reaction tank is provided with a capillary array inlet, a chemiluminescent reagent input port and an output port. The array channel CL reaction tank is provided with a plurality of microchannels. The number of the plurality of microchannels is 2-384. A diameter of each microchannel of the plurality of microchannels is 200-5000 μm. Each capillary of the capillary array is located in a corresponding microchannel. The chemiluminescent reagent generates a sheath flow around each capillary driven by a delivery pump. When a separated component flows out of the capillary array, it is subjected to CL reaction with the chemiluminescent reagent.

In some embodiments, a chemiluminescent reagent delivery unit comprises a chemiluminescent substrate tank, an oxidant tank, the delivery pump and a mixer. The mixer is configured to mix a chemiluminescent substrate and an oxidant according to a preset ratio and then convey the mixture to the array channel CL reaction tank. The flow rate and mixing ratio are controlled by the computer.

In some embodiments, a chemiluminescent reagent comprises the chemiluminescent substrate and the oxidant. The chemiluminescent substrate is selected from the group consisting of luminol, luminol derivatives (such as isoluminol) and peroxyoxalate esters compounds; and the oxidant is selected from the group consisting of hydrogen peroxide, sodium peroxide, potassium peroxide, permanganate, periodate, hypochlorite, dichromate, ammonium persulfate and ceric sulfate.

In some embodiments, the CAE detection tank comprises a plurality of optical detection windows arranged at a side of the capillary array, an electrophoresis buffer inlet, a waste liquid outlet and a metal electrode (platinum electrode); the array channel CL reaction tank is connected to the electrophoresis cathode tank; and the high-voltage power supply is communicated with the electrophoresis cathode tank and the electrophoresis anode tank.

In some embodiments, a multi-channel detection unit comprises the imaging lens and the plane array or linear array detector, wherein the plane array detector is CCD or a complementary metal oxide semiconductor (CMOS), and the linear array detector is DAD. A photosensitive surface of the array detector faces towards an axial direction of the outlet end of the capillary array (namely the axial detection mode), or faces towards the plurality of optical detection windows near the outlet end of the capillary array (namely the lateral detection mode). In the lateral direction detection mode, a length of each of the plurality of optical detection windows is 1-10 mm; and a distance between the imaging lens and the outlet end of the capillary array (or the optical detection window) is a focal length of the imaging lens.

In some embodiments, the data acquisition and processing unit comprises a data acquisition card and a data processing software; the data acquisition card is connected to the plane array or linear array detector, and is configured to collect a signal of individual channels of the plane array or linear array detector in real time, record a capillary electrophoretogram, and calculate a peak area, peak height and migration time of the separated component in individual channels of the plane array or linear array detector. The data acquisition card is connected to the computer to perform automatic data acquisition and processing.

Compared to the prior art, the present disclosure has the following beneficial effects.

(1) The CAE-CL detection coupled system provided herein is free of a light source. The capillaries can be arranged in a two-dimensional (2D) array (plane array), which remarkably improves the throughput of the capillary array (the number of the capillaries).

(2) The CAE-CL detection coupled system provided herein eliminates the mechanical scanning, and thus can achieve the fast data acquisition and rapid separation and detection.

(3) Regarding the CAE-CL detection coupled system provided herein, the light source is not required. A plane array detector is adopted at the outlet end of the capillary array for detection, such that a signal interference between adjacent capillaries is eliminated, and there is no background signal caused by Rayleigh scattering, Raman scattering and solvent fluorescence impurities, contributing to excellent sensitivity. Therefore, the CAE-CL detection coupled system provided herein can be applied in bioanalysis, clinical diagnostics, environmental monitoring, and food safety analysis.

(4) The CAE-CL detection coupled system provided herein has high sensitivity, and is thus suitable for the CAE detection of low-concentration components.

(5) Due to the absence of a light source, the system provided herein has a simplified structure and reduced costs.

Figure 1:
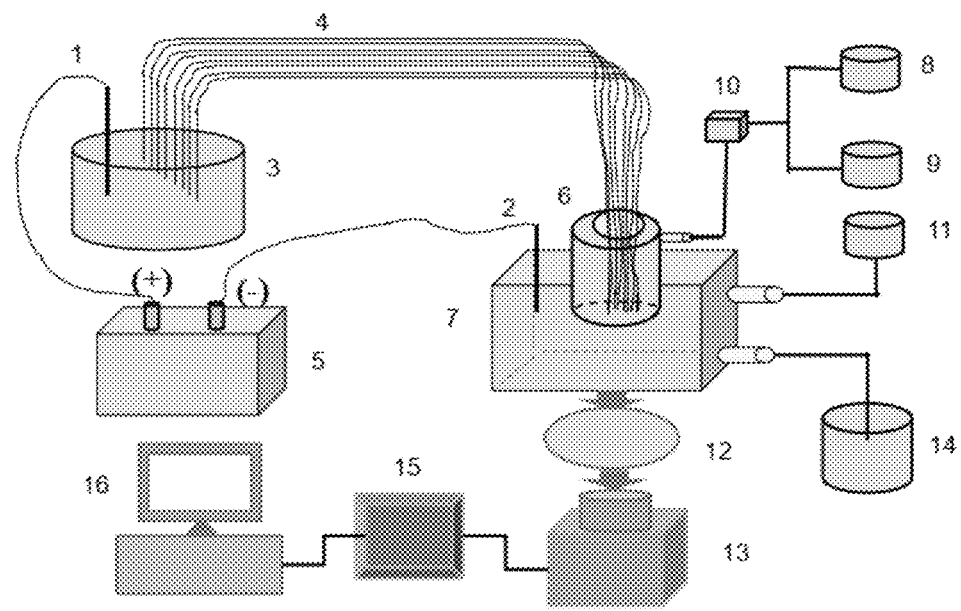
FIG. 1 schematically shows a structure of a CAE-CL detection coupled system according to an embodiment of the disclosure.

In the drawings: 1, platinum anode; 2, platinum cathode; 3, CAE sample tank; 4, capillary array; 5, high-voltage power supply; 6, array channel CL reaction tank; 7, CAE detection tank; 8, chemiluminescent substrate tank; 9, oxidant tank; 10, mixer (including a delivery pump); 11, electrophoresis buffer storage tank; 12, imaging lens; 13, plane array detector; 14, waste liquid tank; 15, data acquisition and processing unit; and 16, computer.

DETAILED DESCRIPTION OF EMBODIMENTS

Embodiment 1

Figure 2:
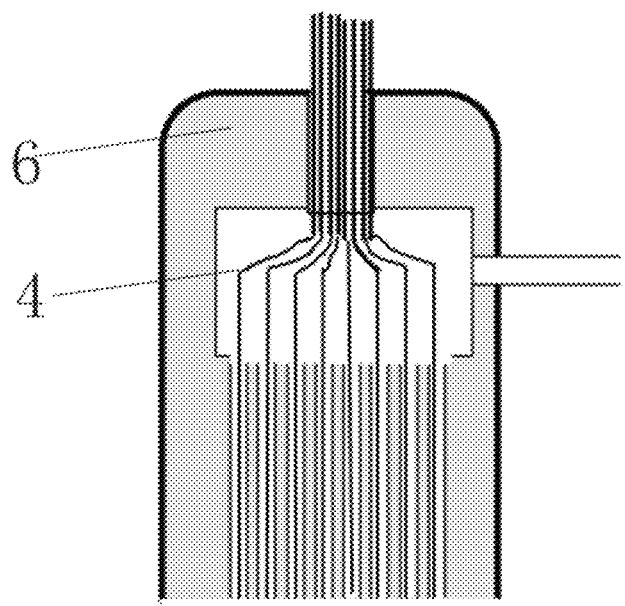
FIG. 2 is a side view of an array channel CL reaction tank under an axial detection mode.
Figure 3:
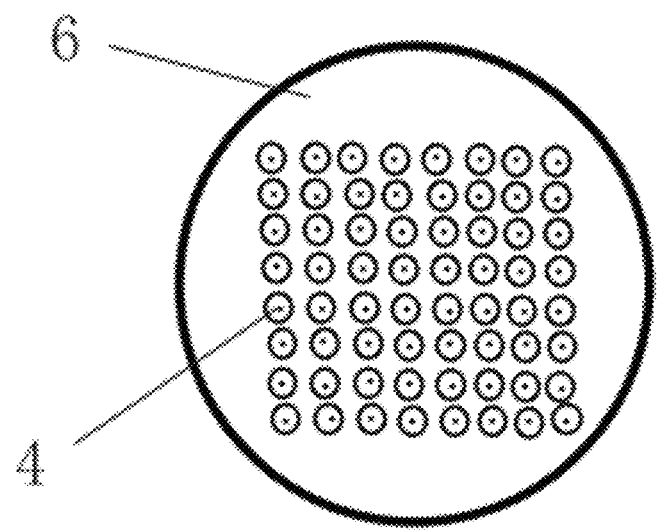
FIG. 3 is a sectional view of a microchannel array in the array channel CL reaction tank under the axial detection mode.
Figure 6:
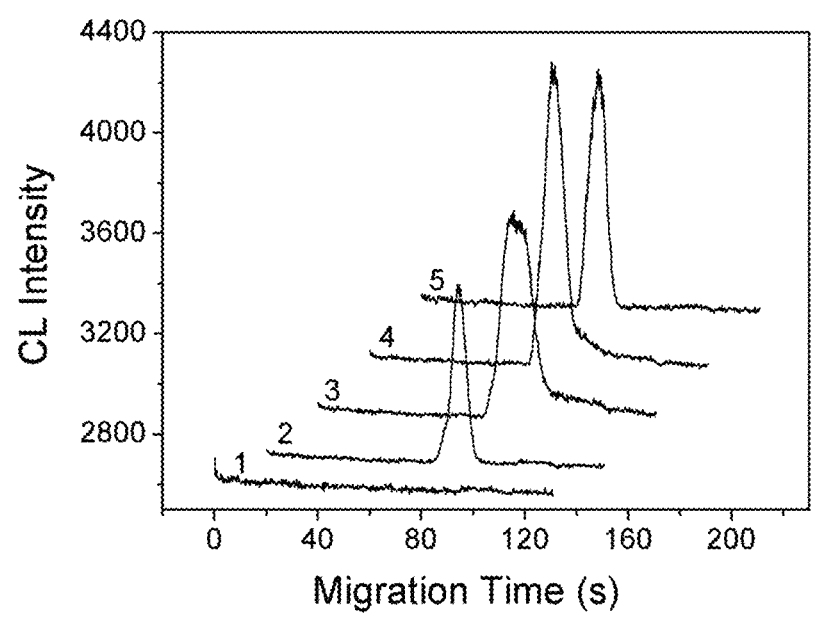
FIG. 6 is a capillary array electrophoretogram of horseradish peroxidase (HRP) under the axial detection mode.

The CAE detection of HRP was conducted under an axial detection mode of a CAE-CL detection coupled system (shown in FIGS. 1-3) and the capillary array electrophoretogram was shown in FIG. 6, where the capillary array consisted of five capillaries is 5; and the sample was $1.0 \times 10^{-8}$ mol/L HRP. Referring to FIG. 6, the sample peak was observed in the $2^{nd}$-the $5^{th}$ capillaries. The $1^{st}$ capillary without the sample was free of the sample peak, indicating that its detection was not interfered by other capillaries (such as the $4^{th}$ capillary and the $5^{th}$ capillary).

The capillaries were made of quartz, each having an inner diameter of 50 μm and a length of 30 cm. The electrophoresis buffer was 3.7 mmol/L sodium borate solution (pH=10.2). The CL reagent was prepared by 50 mmol/L $NaHCO_3$ (pH=9.0), $7.5 \times 10^{-3}$ mol/L $H_2O_2$, $7.5 \times 10^{-4}$ mol/L luminol and $1.25 \times 10^{-3}$ mol/L ethylenediaminetetraacetic acid (EDTA). The electrophoresis was conducted at 15 kV. As shown in FIG. 1, the sample was introduced to the capillary array 4 from the platinum anode 1, and then migrated to the platinum cathode 2 under the high electric field provided by the high-voltage power supply 5. After electrophoresis time, the separated sample flowed out of the outlet end of the capillary and met with chemiluminescent reagents (fed from the chemiluminescent substrate tank 8 and the oxidant 9) in the array channel CL reaction tank 6. The generated chemiluminescent signal was captured by an imaging lens 12 and a plane array detector 13 (CCD), and was processed with data acquisition and processing unit 15. In this case, the photosensitive surface of CCD faced towards the axial direction of the outlet end of the capillary array. The capillary array electrophoretogram was shown in FIG. 6 and was output by a computer 16.

Embodiment 2

Figure 4:
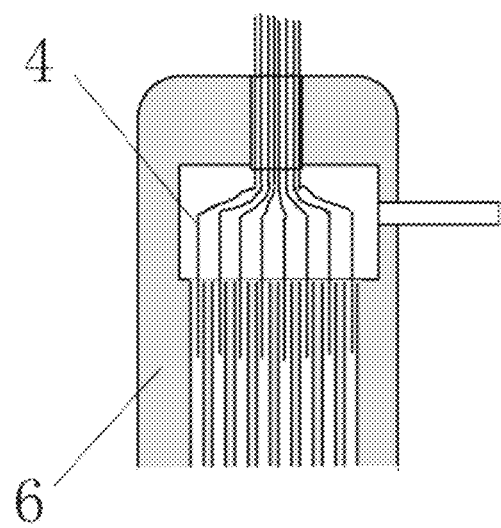
FIG. 4 is a side view of the array channel CL reaction tank under a lateral detection mode.
Figure 5:
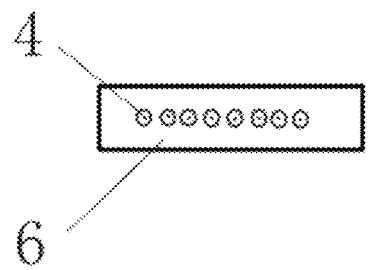
FIG. 5 is a sectional view of the microchannel array in the array channel CL reaction tank under the lateral detection mode.
Figure 7:
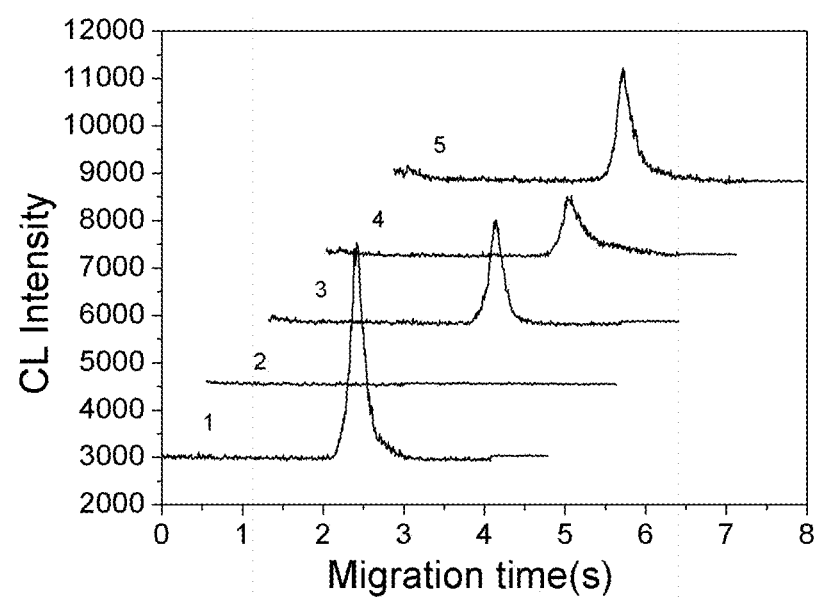
FIG. 7 is a capillary array electrophoretogram of HRP under the lateral detection mode.

The CAE detection of HRP was conducted under a lateral detection mode of a CAE-CL detection coupled system (shown in FIGS. 1 and 4-5), and the capillary array electrophoretogram was shown in FIG. 7, where the capillary array consisted of five capillaries, and the sample was $1.0 \times 10^{-8}$ mol/L HRP. Referring to FIG. 7, the sample peak was observed in the $1^{st}$ capillary and the $3^{rd}$-$5^{th}$ capillaries. The $2^{nd}$ capillary without sample loading was free of the sample peak, indicating that other capillaries (such as the $1^{st}$ capillary and the $3^{rd}$-$5^{th}$ capillaries) had no interference with its detection.

The capillaries were made of quartz, each having an inner diameter of 50 μm and a length of 36 cm. The electrophoresis buffer was 3.7 mmol/L sodium borate solution (pH=10.2). The CL reagent was prepared by 50 mmol/L $NaHCO_3$ (pH=9.0), $7.5 \times 10^{-3}$ mol/L $H_2O_2$, $7.5 \times 10^{-4}$ mol/L luminol and $1.25 \times 10^{-4}$ mol/L EDTA. The electrophoresis was performed at 10 kV. In this case, the photosensitive surface of CCD faced towards the lateral direction of the outlet end of the capillary array.

What is claimed is:

1. A capillary array electrophoresis (CAE)-chemiluminescence (CL) detection coupled system, comprising:
    a CAE sample tank;
    a CAE detection tank;
    a capillary array;
    a high-voltage power supply;
    an array channel CL reaction tank;
    a chemiluminescent reagent delivery unit;
    a multi-channel detection unit comprising an array detector;
    a data acquisition and processing unit; and
    a computer;
    wherein a cathode terminal of the high-voltage power supply is connected to the CAE detection tank, and an anode terminal of the high-voltage power supply is connected to the CAE sample tank; and an inlet end of the capillary array is connected to the CAE sample tank;
    an outlet end of the capillary array is inserted into the array channel CL reaction tank; and
    the array channel CL reaction tank is connected to the CAE detection tank; a photosensitive surface of the array detector is configured to face towards the outlet end of the capillary array through an imaging lens; the data acquisition and processing unit is configured to collect a signal of individual channels of the array detector, and transmit the signal to the computer; a plurality of microchannels are provided inside the array channel CL reaction tank; an outlet end of each capillary of the capillary array is arranged in a corresponding microchannel; and the chemiluminescent reagent delivery unit is configured to deliver a chemiluminescent reagent to the plurality of microchannels to form a sheath flow around each capillary, so as to allow the chemiluminescent reagent to flow out along the outlet end of each capillary.

2. The CAE-CL detection coupled system of claim 1, wherein a top of the array channel CL reaction tank is provided with a capillary array inlet to allow the capillary array to enter the array channel CL reaction tank; the plurality of microchannels are arranged at a lower portion of the array channel CL reaction tank; a cavity is provided above the plurality of microchannels; and a side wall of the cavity is provided with a chemiluminescent reagent inlet to allow the chemiluminescent reagent to enter the array channel CL reaction tank.

3. The CAE-CL detection coupled system of claim 2, wherein the chemiluminescent reagent delivery unit comprises a chemiluminescent substrate tank, an oxidant tank and a mixer; a delivery pump is arranged inside the mixer; and the delivery pump is connected to the chemiluminescent reagent inlet.

4. The CAE-CL detection coupled system of claim 3, wherein the chemiluminescent substrate tank is configured to accommodate a chemiluminescent substrate; the oxidant tank is configured to accommodate an oxidant; the chemiluminescent substrate is selected from the group consisting of luminol, luminol derivatives and peroxyoxalate ester compounds; and the oxidant is selected from the group consisting of hydrogen peroxide, sodium peroxide, potassium peroxide, permanganate, periodate, hypochlorite, dichromate, ammonium persulfate and ceric sulfate.

5. The CAE-CL detection coupled system of claim 1, wherein the CAE detection tank is connected to an electrophoresis buffer storage tank and a waste liquid outlet.

6. The CAE-CL detection coupled system of claim 1, wherein the plurality of microchannels are arranged in a plane array or a linear array.

7. The CAE-CL detection coupled system of claim 6, wherein the number of the plurality of microchannels is 2-384; and a diameter of each of the plurality of microchannels is 200-5,000 μm.

8. The CAE-CL detection coupled system of claim 6, wherein the multi-channel detection unit further comprises the imaging lens; and the array detector is a charge coupled device (CCD), a complementary metal oxide semiconductor (CMOS) or a diode array detector (DAD).

9. The CAE-CL detection coupled system of claim 8, wherein when the array detector is CCD or CMOS, a photosensitive surface of the array detector faces towards an axial direction of the outlet end of the capillary array;
    when the capillary array is arranged in linear array, the array detector is DAD, and a photosensitive surface of the array detector faces towards the plurality of optical detection windows near the outlet end of the capillary array; and a length of each of the plurality of optical detection windows is 1-10 mm; and
    a distance between the imaging lens and the outlet end of the capillary array is a focal length of the imaging lens.

10. The CAE-CL detection coupled system of claim 1, wherein the data acquisition and processing unit comprises a data acquisition card and a data processing software; the data acquisition card is connected to the array detector, and is configured to collect the signal of individual channels of the array detector in real time and record a capillary electrophoretogram of individual channels of the array detector; and the computer is configured to perform baseline noise filtering on the capillary electrophoretogram, calculate peak area, peak height and migration time of components in individual channels of the array detector, and analyze and process sample data.

* * * * *